United States Patent
Hashimoto et al.

(10) Patent No.: US 9,982,590 B2
(45) Date of Patent: May 29, 2018

(54) INTERNAL-COMBUSTION-ENGINE SUPERCHARGER

(71) Applicant: HONDA MOTOR CO., LTD., Tokyo (JP)

(72) Inventors: Akinori Hashimoto, Wako (JP); Takahiro Shinkai, Wako (JP); Hiroki Yokoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 14/735,143

(22) Filed: Jun. 10, 2015

(65) Prior Publication Data

US 2015/0377194 A1 Dec. 31, 2015

(30) Foreign Application Priority Data

Jun. 30, 2014 (JP) ................................. 2014-134378

(51) Int. Cl.
*F02B 37/12* (2006.01)
*F02B 37/16* (2006.01)
(Continued)

(52) U.S. Cl.
CPC .............. *F02B 37/12* (2013.01); *F02B 37/16* (2013.01); *F04D 25/024* (2013.01);
(Continued)

(58) Field of Classification Search
CPC .... F02B 37/12; F02B 37/16; F02B 2037/125; F04D 25/024; F04D 27/0215;
(Continued)

(56) References Cited

U.S. PATENT DOCUMENTS 4,490,622 A * 12/1984 Osborn ................... F01D 25/16
290/2
2013/0045082 A1* 2/2013 Dellmann ................ F01D 9/06
415/58.4
(Continued)

FOREIGN PATENT DOCUMENTS

CN 103154466 6/2013
JP 07-279677 10/1995
(Continued)

OTHER PUBLICATIONS

Japanese Office Action for corresponding JP Application No. 2014-134378, dated Nov. 22, 2016 (w/ English machine translation).

(Continued)

*Primary Examiner* — Audrey K Bradley
(74) *Attorney, Agent, or Firm* — Mori & Ward, LLP

(57) ABSTRACT

An internal-combustion-engine supercharger includes a centrifugal compressor, a pre-compression flow path, a post-compression flow path, a bypass passage, and a control valve. The centrifugal compressor is disposed in an intake passage of an internal combustion engine and has an impeller to compress and discharge intake air using a radial centrifugal force generated by rotating the impeller. The intake air in the post-compression flow path is to be recirculated to the pre-compression flow path via the bypass passage. A connecting portion between the bypass passage and the pre-compression flow path is disposed at a position other than an extreme-bottom surface portion located at a lowest portion in a flow path section of the pre-compression flow path in a state where the internal-combustion-engine supercharger is installed in a vehicle. The control valve is disposed in the bypass passage to control a recirculation flow rate of the intake air.

30 Claims, 5 Drawing Sheets

(51) Int. Cl.
*F02M 35/10* (2006.01)
*F04D 27/02* (2006.01)
*F04D 25/02* (2006.01)
*F02M 25/06* (2016.01)

(52) U.S. Cl.
CPC .... *F04D 27/0215* (2013.01); *F02B 2037/125* (2013.01); *F02M 25/06* (2013.01); *F02M 35/10157* (2013.01); *F05D 2220/40* (2013.01); *Y02T 10/144* (2013.01)

(58) Field of Classification Search
CPC .............. F02M 25/06; F02M 35/10157; F05D 2220/40; Y02T 10/144

See application file for complete search history.

(56) References Cited

U.S. PATENT DOCUMENTS

| | | | |
|---|---|---|---|
| 2013/0152582 A1* | 6/2013 | Anschel | ................... F01D 9/026 60/605.2 |
| 2013/0283788 A1* | 10/2013 | Kobayashi | ......... F02M 25/0709 60/605.2 |

FOREIGN PATENT DOCUMENTS

| | | | |
|---|---|---|---|
| JP | 07279677 A | * | 10/1995 |
| JP | 10-231731 | | 9/1998 |
| JP | 11-182257 | | 7/1999 |
| JP | 2014-101827 | | 6/2014 |

OTHER PUBLICATIONS

Japanese Office Action for corresponding JP Application No. 2014-134378, dated Jun. 13, 2017 (w/ English machine translation).
Chinese Office Action for corresponding CN Application No. 201510259416.X, dated Jan. 22, 2018 (w/ machine translation).

* cited by examiner

INTERNAL-COMBUSTION-ENGINE SUPERCHARGER

CROSS-REFERENCE TO RELATED APPLICATIONS

The present application claims priority under 35 U.S.C. § 119 to Japanese Patent Application No. 2014-134378, filed Jun. 30, 2014, entitled "Internal-combustion-engine Supercharger." The contents of this application are incorporated herein by reference in their entirety.

BACKGROUND

1. Field

The present application relates to an internal-combustion-engine supercharger.

2. Description of the Related Art

A conventional internal-combustion-engine supercharger of a vehicle is disclosed in Japanese Unexamined Patent Application Publication No. 07-279677. In the technique disclosed therein, a bypass passage for recirculating intake air that is compressed by a radial centrifugal force generated by rotation of an impeller is provided. Furthermore, a control valve for controlling the recirculation flow rate of the intake air is provided at an intermediate point of the bypass passage.

Superchargers are being reduced in size and increased in response rate to eliminate turbo lag. Under the circumstances, if an impeller is rotated by a driving force, it cannot compress the intake air and idles, causing a surge. A bypass passage eliminates a surge by recirculating intake air compressed by the supercharger into intake air to be taken in before compression.

SUMMARY

According to one aspect of the present invention, an internal-combustion-engine supercharger includes a centrifugal compressor, a pre-compression flow path, a post-compression flow path, a bypass passage, and a control valve. The centrifugal compressor is disposed in an intake passage of an internal combustion engine and compresses and discharges intake air flowing therein with a radial centrifugal force generated by rotation of an impeller. The intake air to enter the impeller flows through the pre-compression flow path. The post-compression flow path is disposed below the pre-compression flow path in a state installed in a vehicle and the intake air that is compressed by and discharged from the impeller flows through the post-compression flow path. The bypass passage is for recirculating the intake air in the post-compression flow path to the pre-compression flow path. The control valve is disposed at an intermediate point of the bypass passage and controls the recirculation flow rate of the intake air. A connecting portion between the bypass passage and the pre-compression flow path is disposed at a position other than an extreme-bottom surface portion of a flow path section of the pre-compression flow path in a state installed in the vehicle.

According to another aspect of the present invention, an internal-combustion-engine supercharger includes a centrifugal compressor, a pre-compression flow path, a post-compression flow path, a bypass passage, and a control valve. The centrifugal compressor is disposed in an intake passage of an internal combustion engine and has an impeller to compress and discharge intake air using a radial centrifugal force generated by rotating the impeller. The intake air is to flow into the impeller through the pre-compression flow path. The post-compression flow path is disposed below the pre-compression flow path in a state where the internal-combustion-engine supercharger is installed in a vehicle and the intake air discharged from the impeller is to flow through the post-compression flow path. The intake air in the post-compression flow path is to be recirculated to the pre-compression flow path via the bypass passage. A connecting portion between the bypass passage and the pre-compression flow path is disposed at a position other than an extreme-bottom surface portion located at a lowest portion in a flow path section of the pre-compression flow path in the state where the internal-combustion-engine supercharger is installed in the vehicle. The control valve is disposed in the bypass passage to control a recirculation flow rate of the intake air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 4A and 4B are schematic views showing the configuration of a compressor according to this embodiment, in which FIG. 4A is a partially see-through side view, and FIG. 4B is a sectional view taken along line IVB-IVB in FIG. 4A.

DESCRIPTION OF THE EMBODIMENTS

Figure 1:
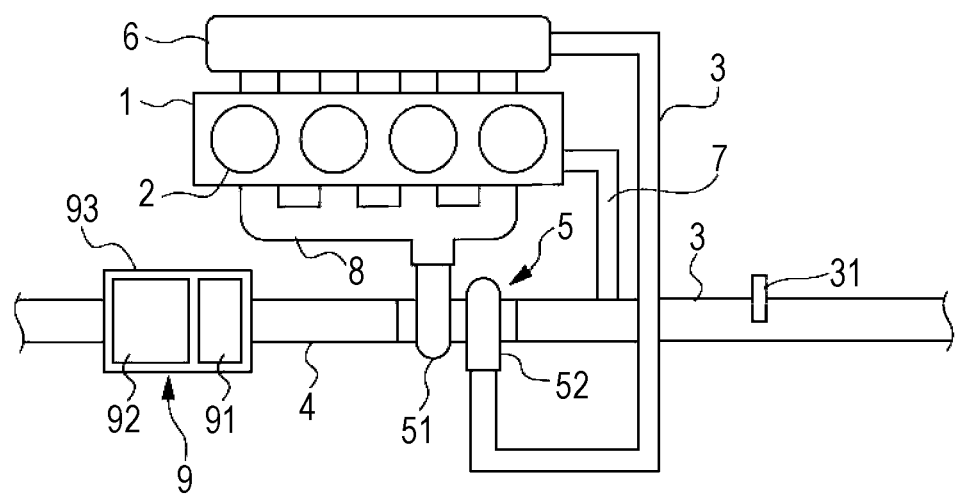
FIG. 1 is a schematic view showing the configuration of an internal combustion engine according to an embodiment of the present application.

The embodiments will now be described with reference to the accompanying drawings, wherein like reference numerals designate corresponding or identical elements throughout the various drawings.

An embodiment of the present application will be described in detail below with reference to the drawings.

Figure 2A:
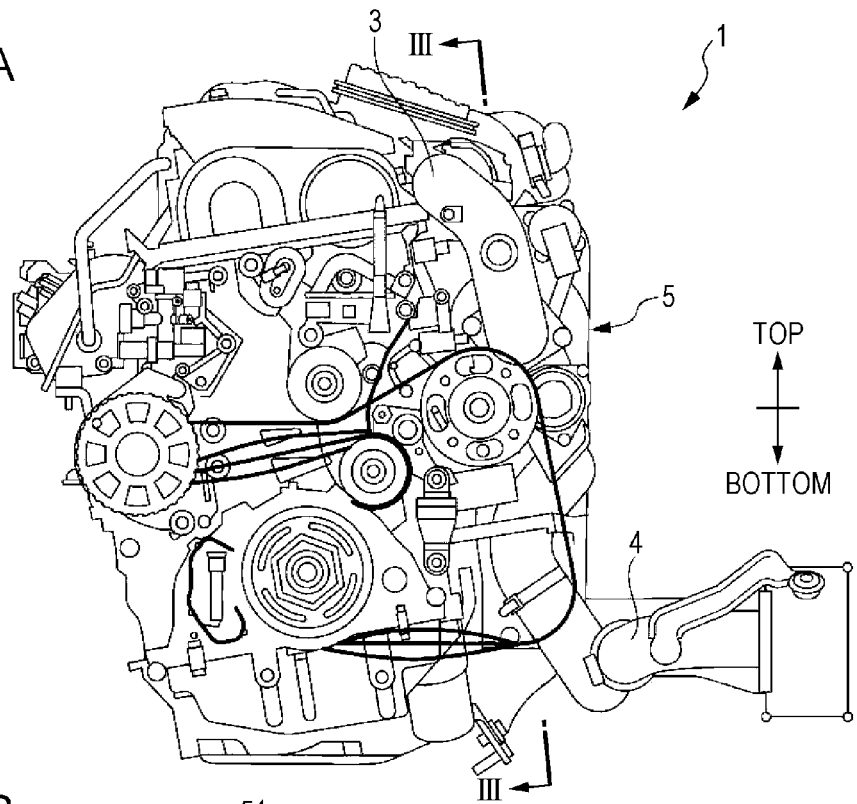
FIGS. 2A and 2B are a side external view and a front external view of the internal combustion engine according to this embodiment, respectively.
Figure 2B:
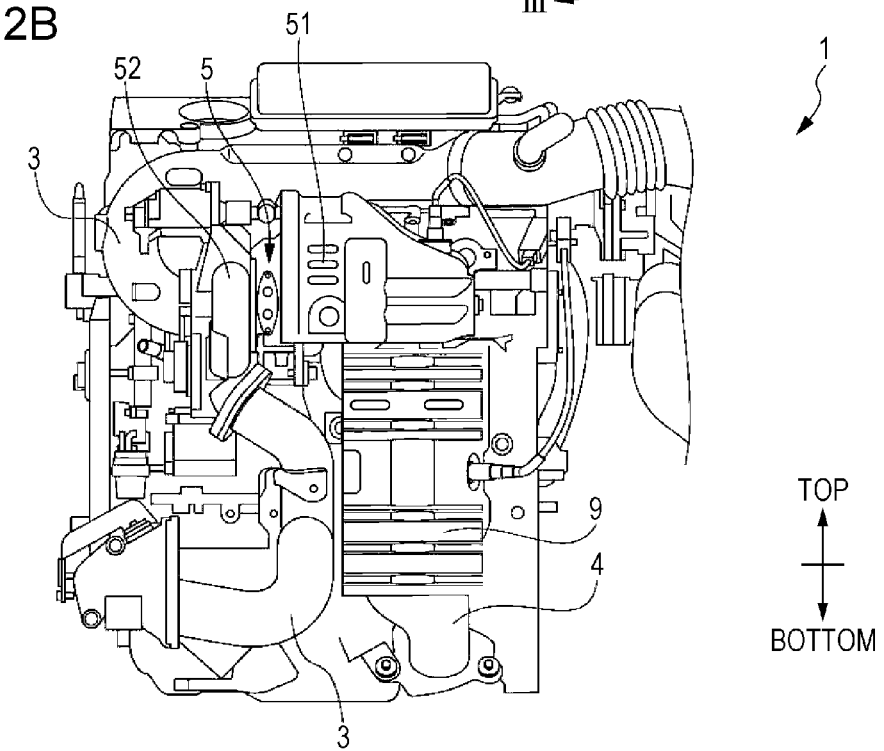

FIG. 1 is a schematic view showing the configuration of an internal combustion engine 1 according to this embodiment. FIGS. 2A and 2B are a side external view and a front external view of the internal combustion engine 1 according to this embodiment, respectively.

The internal combustion engine 1 is installed in a vehicle and has four cylinders 2. The internal combustion engine 1 is a diesel engine in which fuel is directly injected into combustion chambers of the cylinders 2. Each of the cylinders 2 of the internal combustion engine 1 has a fuel injection valve (not shown).

The internal combustion engine 1 includes an electronic control unit (ECU) (not shown) that is electrically connected to the fuel injection valves. The ECU controls the periods of opening and closing the fuel injection valves.

The internal combustion engine 1 includes an intake pipe 3, an exhaust pipe 4, and a turbocharger 5.

The intake pipe 3 serves as an intake passage through which intake air flows, and the intake pipe 3 is connected to intake-air ports in the cylinders 2 of the internal combustion engine 1 via a plurality of branch portions of an intake-air manifold 6.

An air flow meter 31 is provided at an intermediate point of the intake pipe 3.

The air flow meter 31 senses the flow rate of the intake air flowing through the intake pipe 3.

The air flow meter 31 is electrically connected to the ECU and sends a detection signal indicating the flow rate of the intake air flowing through the intake pipe 3 to the ECU.

A positive crankcase ventilation (PCV) passage 7 is provided between an intermediate point of the intake pipe 3 on the downstream side of the air flow meter 31 in the intake-air flow direction and the internal combustion engine 1.

The PCV passage 7 allows an oil component recovered in a breather of the internal combustion engine 1 to flow into the intake pipe 3. The oil component flowing in the intake pipe 3 is combusted and removed in the internal combustion engine 1.

The exhaust pipe 4 serves as an exhaust passage through which the exhaust gas flows, and the exhaust pipe 4 is connected to exhaust gas ports in the cylinders 2 of the internal combustion engine 1 via a plurality of branch portions of an exhaust gas manifold 8.

Figure 3:
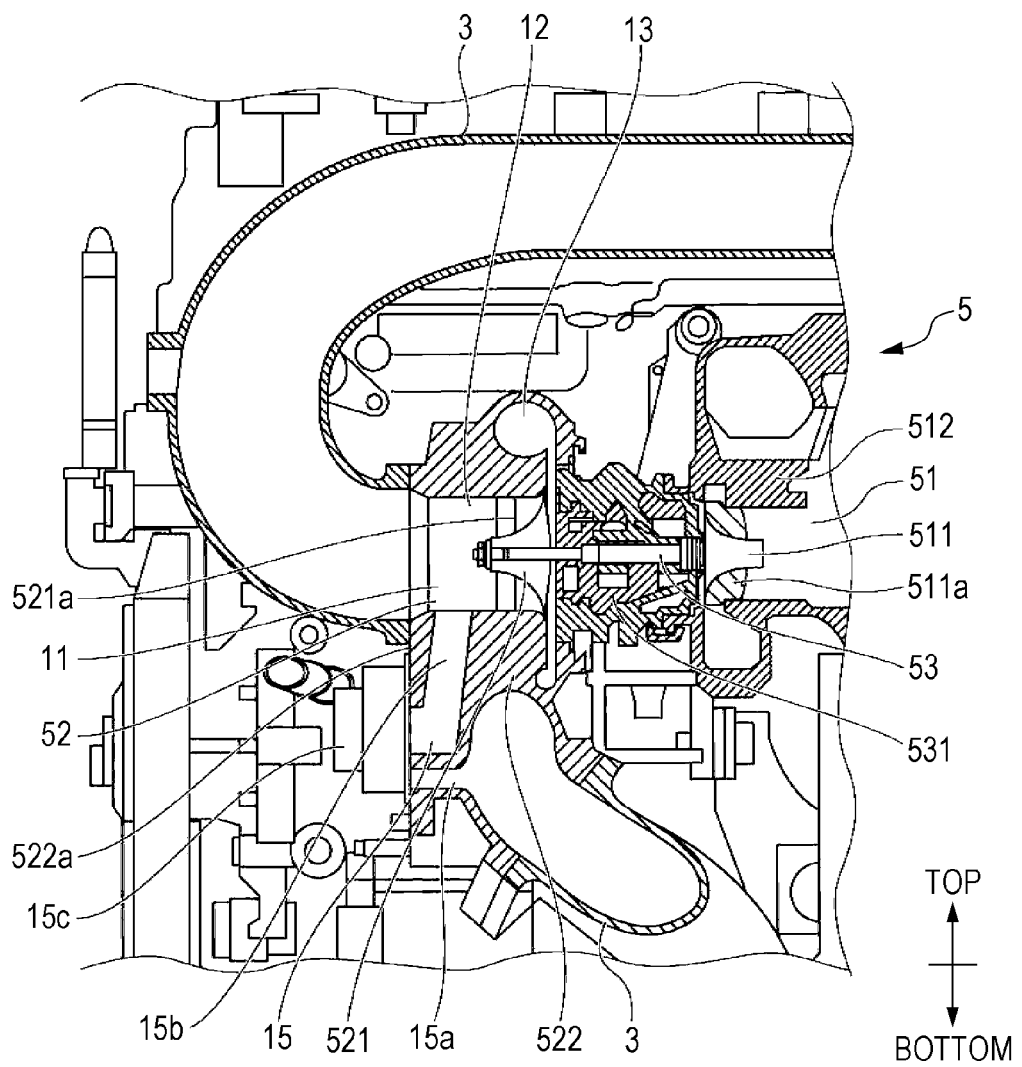
FIG. 3 is a sectional view of a turbocharger installed in the internal combustion engine according to this embodiment.

FIG. 3 is a sectional view of the turbocharger 5 installed in the internal combustion engine 1 according to this embodiment. FIG. 3 shows a section, taken along line III-III in FIG. 2A, of the turbocharger 5 installed in the internal combustion engine 1.

The turbocharger 5 supplies the intake air, using the energy of the exhaust gas.

The turbocharger 5 includes a turbine 51 and a compressor 52 that are coaxially connected to each other by a shaft 53.

The turbocharger 5 has the turbine 51 on the right side and the compressor 52 on the left side, in front view of the internal combustion engine 1 installed in the vehicle, as shown in FIG. 2B. Furthermore, the intake pipe 3 on the upstream side of the turbocharger 5 in the intake-air flow direction extends from the upper right side of the turbocharger 5 and is connected to the compressor 52 from the left side so as to wrap around the upper part of the turbocharger 5. The intake pipe 3 on the downstream side of the turbocharger 5 in the intake-air flow direction extends downward from the compressor 52. Furthermore, the exhaust pipe 4 on the downstream side of the turbocharger 5 in the exhaust-gas flow direction extends from the right side of the turbine 51.

The turbine 51 is disposed at an intermediate point of the exhaust pipe 4.

The turbine 51 includes a frusto-conical turbine wheel 511 that has a concave outer circumferential slope surface, and a turbine housing 512 that accommodates the turbine wheel 511. The turbine housing 512 is cylindrical and is joined to an end of a tubular bearing housing 531 so as to be coaxial with the shaft 53. The turbine wheel 511 includes an array of a plurality of turbine blades 511a.

The turbine 51 includes a variable nozzle (VNT) that controls the circulation rate of the exhaust gas by changing the opening area between the turbine blades 511a. The variable nozzle is connected to an actuator via a link mechanism and is opened and closed by the actuator. The actuator is mounted to a mounting base provided on the outside of the turbine housing 512 and is controlled by the ECU.

The compressor 52 is disposed in the intake pipe 3 on the downstream side of a connecting portion 16 with respect to a PCV passage 7 in the intake-air flow direction.

The compressor 52 includes a frusto-conical impeller 521 that has a concave tapered outer circumferential surface, and a compressor housing 522 that accommodates the impeller 521. The impeller 521 and the turbine wheel 511 are coaxially joined together by the shaft 53 such that they face opposite directions and are rotated together. The impeller 521 includes an array of a plurality of compressor blades 521a.

The compressor housing 522 is cylindrical and is joined to the other end of the tubular bearing housing 531 so as to be coaxial with the shaft 53. The compressor housing 522 has a larger diameter and capacity than the turbine housing 512.

The bearing housing 531 joins the turbine housing 512 and the compressor housing 522 and supports the shaft 53 in a rotatable manner via a bearing (not shown).

An exhaust gas purifier 9 is provided in the exhaust pipe 4 on the downstream side of the turbine 51 in the exhaust-gas flow direction. The exhaust gas purifier 9 includes an oxidation catalyst 91, a diesel particulate filter (DPF) 92, and a case 93 that accommodates them in this order from the upstream side in the exhaust-gas flow direction.

The oxidation catalyst 91 heats the exhaust gas with the heat generated by reactions with the exhaust gas and the fuel.

The oxidation catalyst 91 is formed of, for example, platinum (Pt), serving as a catalyst, supported on an alumina ($Al_2O_3$) carrier; zeolite, which has an excellent hydrocarbon (HC) absorbing performance; and rhodium (Rh), which has an excellent HC steam-reforming performance.

The DPF 92 collects particulate matter (PM) that is deposited on the surface of a filter wall and in pores in the filter wall when the exhaust gas passes through the tiny pores in the filter wall. The filter wall is made of a ceramic porous member composed of, for example, silicon carbide.

Once the DPF 92 collects PM to the limit of its collecting capability, i.e., the accumulation limit, the pressure loss in the exhaust pipe 4 increases. Hence, DPF regeneration control for combusting and removing the PM collected in the DPF 92 is performed. Alternatively, the DPF 92 may combust and remove the PM while continuously collecting the PM.

A selective catalytic reduction (SCR) catalyst that reduces NOx in the exhaust gas by receiving the supply of liquid urea may be provided in the exhaust pipe 4 on the downstream side of the DPF 92 in the exhaust-gas flow direction.

Next, the compressor 52 of the turbocharger 5 according to this embodiment will be described.

Figure 4A:
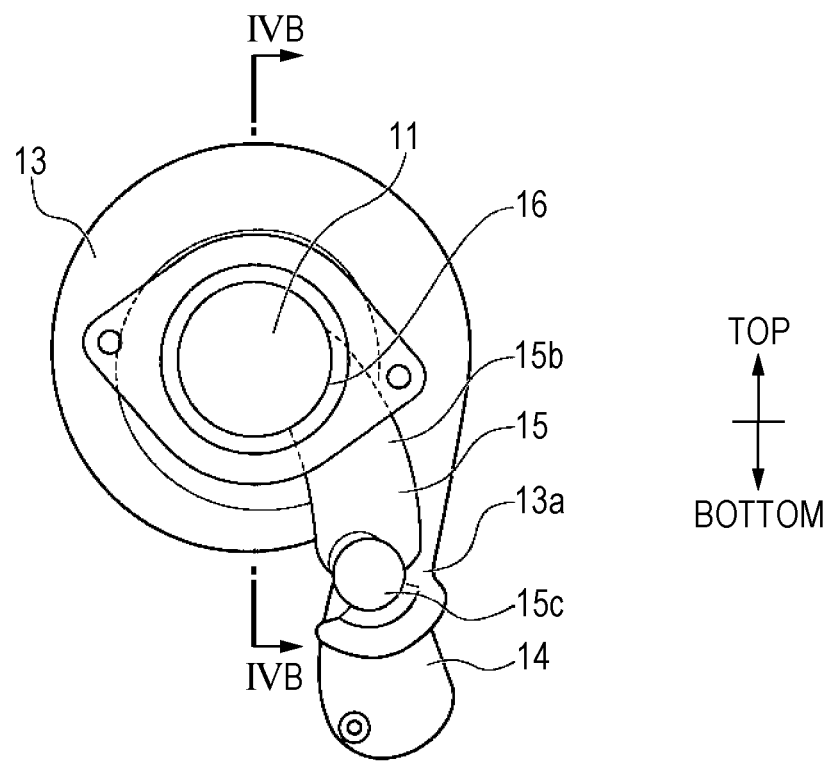
Figure 4B:
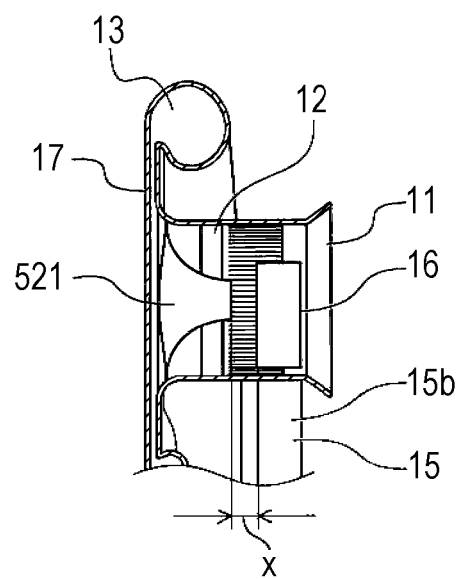

FIGS. 4A and 4B are schematic views showing the configuration of the compressor 52 according to this embodiment, in which FIG. 4A is a partially see-through side view, and FIG. 4B is a sectional view taken along line IVB-IVB in FIG. 4A.

The compressor 52 is a centrifugal compressor that compresses and discharges the intake air flowing therein with a radial centrifugal force generated by rotation of the impeller 521.

The compressor 52 includes the compressor housing 522, in which a pre-compression flow path 11, an impeller accommodating chamber 12, a scroll flow path 13, a post-compression flow path 14, and a bypass passage 15 are integrally formed.

The pre-compression flow path 11 is formed in a cylindrical shape having an axis parallel to the axis of the impeller 521 and allows the intake air flowing therein from the intake pipe 3 to enter the impeller 521 along the axis thereof.

The impeller accommodating chamber 12 is formed in a cylindrical shape, on the downstream side of the pre-compression flow path 11 in the intake-air flow direction, so as to be concentric and continuous with the pre-compression flow path 11 and accommodates the impeller 521. The impeller accommodating chamber 12 is closed behind the impeller 521 so as to be continuous with the scroll flow path 13.

The scroll flow path 13 is formed in a ring shape having a circular section so as to encircle the outer circumference of the impeller accommodating chamber 12 with respect to the axis thereof. The intake air that is compressed by and discharged from the impeller 521 flows through the scroll flow path 13. The scroll flow path 13 is connected to the impeller accommodating chamber 12 positioned at the center via a small-ring-shaped flow path 17 that is formed of an end of the cylindrical impeller accommodating chamber 12 extended outward in a ring shape and the closed back surface of the impeller accommodating chamber 12, the small-ring-shaped flow path 17 being perpendicular to the axial direction. The scroll flow path 13 is a circular shape starting at a starting point where the circular sectional area thereof is minimum and ending at a terminating point where the axis thereof is displaced from that at the starting point, while increasing the sectional area thereof, so as to pass through the lower part and upper part of an extension line perpendicular to the axis of the impeller 521.

The post-compression flow path 14 is disposed below the pre-compression flow path 11 in a state installed in the internal combustion engine 1 on the vehicle and discharges the intake air collected and compressed in the scroll flow path 13. The post-compression flow path 14 extends downward from the terminating point of the scroll flow path 13 and is formed in a tubular shape continuous with a scroll end 13a located at the terminating point of the scroll flow path 13.

The bypass passage 15 recirculates the intake air in the post-compression flow path 14 to the pre-compression flow path 11.

The bypass passage 15 connects the post-compression flow path 14 and the pre-compression flow path 11 in the compressor housing 522, which are formed integrally with the bypass passage 15. More specifically, as shown in FIG. 3, the bypass passage 15 includes a first flow path 15a that is open in a side end face 522a of the compressor housing 522 and a second flow path 15b that extends from an opening provided above the opening of the first flow path 15a in the side end face 522a and is continuous with the pre-compression flow path 11. The first flow path 15a and the second flow path 15b are formed by splitting the post-compression flow path 14 in the horizontal direction parallel to the axis of the impeller 521.

The bypass passage 15 further includes a control valve 15c that connects the openings of the first flow path 15a and second flow path 15b provided in the side end face 522a of the compressor housing 522, located at an intermediate point in the bypass passage 15, so as to allow the intake air to flow therebetween and controls the recirculation flow rate of the intake air.

The control valve 15c may be of a vacuum type in which a valve is connected to a vacuum actuator via a link mechanism and is controlled due to a negative pressure being applied to the vacuum actuator, or of an electric type in which a valve is controlled by an electric motor that is connected thereto via a link mechanism. The control valve 15c is attached to the side end face 522a of the compressor housing 522 and is controlled by the ECU.

Figure 5:
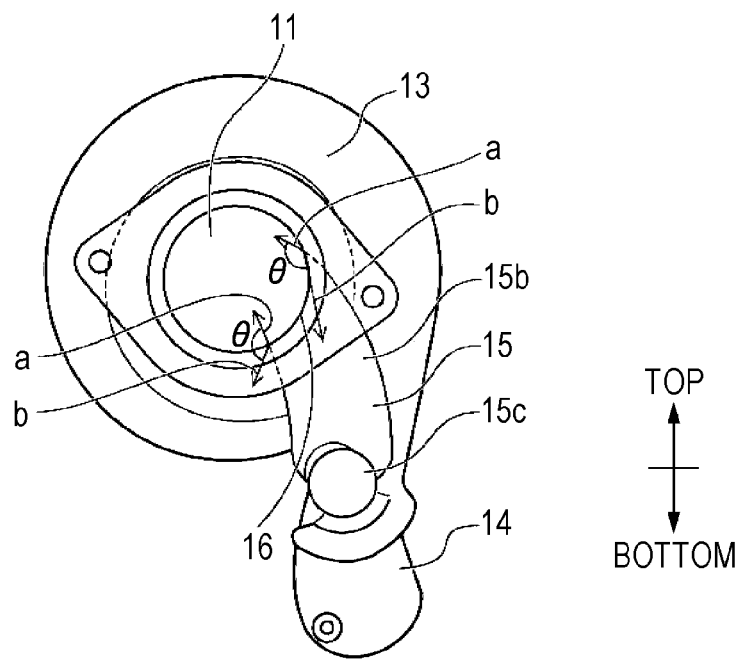
FIG. 5 shows a connecting portion between a bypass passage and a pre-compression flow path of the compressor according to this embodiment.

FIG. 5 shows the connecting portion 16 between the bypass passage 15 and the pre-compression flow path 11 of the compressor 52 according to this embodiment.

The second flow path 15b has a rectangular section and connects the control valve 15c and the connecting portion 16 which connects the second flow path 15b and the pre-compression flow path 11. The second flow path 15b is smoothly curved in such a direction that the angle θ between the rotation direction, a, of the impeller 521 and the flow direction, b, of the intake air recirculated through the second flow path 15b, shown in FIG. 5, is reduced. The second flow path 15b is curved with a large curvature from the scroll end 13a of the scroll flow path 13 and is connected to a lower side wall portion of the pre-compression flow path 11 located at the center. The angle θ between the rotation direction, a, of the impeller 521 and the flow direction, b, of the intake air recirculated through the second flow path 15b, shown in FIG. 5, is set to be 180 degrees or less at both ends of the width in the circumferential direction connected to the outer circumference of the pre-compression flow path 11.

Figure 6:
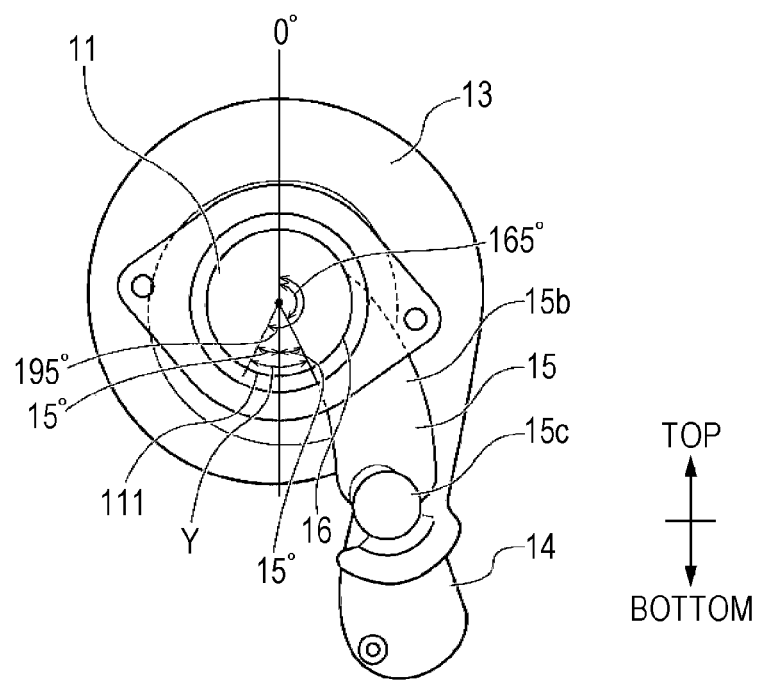
FIG. 6 shows the area of an extreme-bottom surface portion of the compressor according to this embodiment.

FIG. 6 shows the area of an extreme-bottom surface portion 111 of the compressor 52 according to this embodiment.

The connecting portion 16 between the second flow path 15b and the pre-compression flow path 11 is disposed at a position other than the extreme-bottom surface portion 111 in the inner circumferential surface (flow path section) of the pre-compression flow path 11, in a section perpendicular to the axis of the impeller 521.

As shown in FIG. 6, in a section perpendicular to the axis of the impeller 521, the extreme-bottom surface portion 111 corresponds to the area between 165 degrees and 195 degrees, where the upper end of the inner circumferential surface (flow path section) of the pre-compression flow path 11 with respect to the center of the pre-compression flow path 11 is 0 degrees. In other words, the extreme-bottom surface portion 111 has the left and right ends at positions to the left and right of a vertical line extending through the center of the pre-compression flow path 11, by 15 degrees with respect to the center, in the flow path section of the pre-compression flow path 11 in a state installed in the vehicle.

In a section perpendicular to the axis of the impeller 521, the connecting portion 16 having a predetermined width Y is provided between the side of the pre-compression flow path 11 and a position adjacent to the extreme-bottom surface portion 111 on the acute angle side, at an angle of less than 165 degrees.

As shown in FIGS. 3 and 4B, in a section along the axis of the impeller 521, the connecting portion 16 connects the second flow path 15b to a portion of the pre-compression flow path 11 in the compressor housing 522, the portion being a predetermined distance X away from the top of the impeller 521 on the upstream side in the intake-air flow direction.

The connecting portion 16 makes the flow of the intake air recirculated through the second flow path 15b intersect the rotation direction of the impeller 521, as shown in FIG. 5.

Hence, the intake air recirculated to the pre-compression flow path 11 via the connecting portion 16, which has a higher pressure than the intake air flowing from the intake pipe 3, joins the intake air flowing from the intake pipe 3, and the compressed intake air flows into the rotating impeller 521, eliminating a surge during the operation of the turbocharger 5.

This embodiment provides the following advantages.

(1) According to this embodiment, the connecting portion 16 between the bypass passage 15 and the pre-compression flow path 11 is disposed at a position other than the extreme-bottom surface portion 111 of the flow path section of the pre-compression flow path 11 in a state installed in the vehicle. Hence, it is possible to suppress entrance of liquid, such as an oil component recovered in the breather from the intake pipe 3 on the upstream side of the turbocharger 5 in the intake-air flow direction and condensed water resulting from condensation, into the bypass passage 15. Thus, the liquid is less likely to enter the bypass passage 15 and accumulate before the control valve 15c provided at an intermediate point of the bypass passage 15. As a result, the liquid does not freeze in the bypass passage 15, enabling appropriate recirculation of the intake air. Moreover, because the liquid accumulated before the control valve 15c does not flow back when the control valve 15c is opened, sensing by the air flow meter 31 that is disposed in the intake pipe 3, on the upstream side of the bypass passage 15 in the intake-air flow direction, can be performed accurately.

(2) According to this embodiment, because vehicles having the internal combustion engine 1 installed therein typically park on a surface that is inclined at 15 degrees or less with respect to the horizontal surface, even if a vehicle parks on an inclined surface having an inclination of 15 degrees to the maximum with respect to the horizontal surface in a section perpendicular to the axis of the impeller 521, it is possible to reliably prevent the connecting portion 16, which is formed between the side of the pre-compression flow path 11 and a portion at an angle of less than 165 degrees on the acute angle side of the extreme-bottom surface portion, from being located at the extreme-bottom position of the pre-compression flow path 11 in a section perpendicular to the axis of the impeller 521, at which entrance of liquid occurs. As a result, it is possible to reliably suppress entrance of liquid, such as an oil component recovered in the breather from the intake pipe 3 on the upstream side of the turbocharger 5 in the intake-air flow direction and condensed water resulting from condensation, into the bypass passage 15.

(3) According to this embodiment, the second flow path 15b, in the bypass passage 15, between the connecting portion 16 and the control valve 15c is curved in such a direction that the angle θ between the rotation direction, a, of the impeller 521 and the flow direction, b, of the intake air recirculated through the bypass passage 15 is reduced. Therefore, it is possible to reduce the problems incurred with a straight second flow path, i.e., the problems caused by an insufficient sectional area of the flow path and by the presence of a bent portion, and the consequent pressure loss.

Furthermore, the second flow path 15b is smoothly curved in such a direction that the angle θ between the rotation direction, a, of the impeller 521 and the flow direction, b, of the intake air recirculated through the bypass passage 15 is reduced. Because this configuration enables the compressed intake air to be smoothly recirculated without resisting the rotation of the impeller 521, it is possible to reduce the pressure loss occurring in the merging of the intake air entering the impeller 521 and the intake air recirculated through the bypass passage 15. Thus, flowing of the recirculated intake air into the impeller 521 is facilitated, eliminating a surge.

(4) According to this embodiment, because the bypass passage 15 is formed in the compressor housing 522 that accommodates the impeller 521, it is possible to reduce the component count, as well as the manufacturing cost and the weight of the apparatus. Furthermore, because the length of the bypass passage 15 can be reduced, it is possible to reduce the pressure loss occurring in the merging of the intake air entering the impeller 521 and the intake air recirculated through the bypass passage 15.

Note that the present application is not limited to the above-described embodiment, and modifications and improvements within a scope capable of achieving the purpose of the present application are included in the present application.

The supercharger of the present application is not limited to the bypass passage 15 that connects the post-compression flow path 14 and the pre-compression flow path 11 which are integrally formed in the compressor housing 522 according to this embodiment. For example, the bypass passage that connects the post-compression flow path and the pre-compression flow path may be formed not only inside the compressor housing but also in a pre-compression flow path that is provided adjacent to or away from the compressor housing.

The supercharger of the present application has, in a section perpendicular to the axis of the impeller 521 according to this embodiment, the extreme-bottom surface portion 111 that corresponds to an area between 165 degrees and 195 degrees, where the upper end of the inner circumferential surface (flow path section) of the pre-compression flow path 11 with respect to the center of the pre-compression flow path 11 is 0 degrees. For example, in a section perpendicular to the axis of the impeller, the extreme-bottom surface portion corresponds to the area between 165 degrees and 195 degrees, where the upper end of the inner circumferential surface (flow path section) of the pre-compression flow path with respect to the center of the pre-compression flow path is 0 degrees.

The supercharger of present application is not limited to the compressor 52 of the turbocharger 5 according to this embodiment, and it may be, for example, a compressor that is used in a supercharger which employs an electric motor.

A supercharger (for example, a compressor 52 described below) of an internal combustion engine (for example, an internal combustion engine 1 described below) of the present application includes: a centrifugal compressor that is disposed in an intake passage (for example, an intake pipe 3 described below) of an internal combustion engine and compresses and discharges intake air flowing therein with a radial centrifugal force generated by rotation of an impeller (for example, an impeller 521 described below); a pre-compression flow path (for example, a pre-compression flow path 11 described below) through which the intake air to enter the impeller flows; a post-compression flow path (for example, a post-compression flow path 14 described below) that is disposed below the pre-compression flow path in a state installed in a vehicle and through which the intake air that is compressed by and discharged from the impeller flows; a bypass passage (for example, a bypass passage 15 described below) for recirculating the intake air in the post-compression flow path to the pre-compression flow path; and a control valve (for example, a control valve 15c described below) that is disposed at an intermediate point of the bypass passage and controls the recirculation flow rate of the intake air. A connecting portion (for example, a connecting portion 16 described below) between the bypass passage and the pre-compression flow path is disposed at a position other than an extreme-bottom surface portion (for example, an extreme-bottom surface portion 111 described below) of a flow path section of the pre-compression flow path in a state installed in the vehicle.

In the present application, the connecting portion between the bypass passage and the pre-compression flow path is disposed at a position other than the extreme-bottom surface portion of the flow path section of the pre-compression flow path in a state installed in the vehicle. The present application can suppress entrance of liquid, such as an oil component recovered in a breather from the intake passage on the upstream side of the supercharger in the intake-air flow direction and condensed water resulting from condensation, into the bypass passage. Thus, the liquid is less likely to enter the bypass passage and accumulate before the control valve provided at an intermediate point of the bypass passage. As a result, the liquid does not freeze in the bypass passage, enabling appropriate recirculation of the intake air. Moreover, because the liquid accumulated before the control valve does not flow back when the control valve is opened, accurate sensing by the air flow meter is possible.

It is desirable that the extreme-bottom surface portion have a left and right end at positions to the left and right of a vertical line extending through the center of the pre-compression flow path, by 15 degrees with respect to the center, in the flow path section of the pre-compression flow path in a state installed in the vehicle.

According to the present application, because vehicles having the internal combustion engine installed therein typically park on a surface that is inclined at 15 degrees or less with respect to the horizontal surface, it is possible to reliably prevent the connecting portion between the bypass passage and the pre-compression flow path from being located at the extreme-bottom position of the flow path section of the pre-compression flow path in a state installed in the vehicle. As a result, entrance of liquid, such as an oil component recovered in the breather from the intake passage on the upstream side of the supercharger in the intake-air flow direction and condensed water resulting from condensation, into the bypass passage can be reliably suppressed.

It is desirable that a flow path portion of the bypass passage between the connecting portion and the control valve be curved in such a direction that the angle (for example, the angle θ described below) between the rotation direction of the impeller and the flow direction of the intake air recirculated through the bypass passage is reduced.

According to this application, because the flow path portion, in the bypass passage, between the connecting portion and the control valve is curved in such a direction that the angle between the rotation direction of the impeller and the flow direction of the intake air recirculated through the bypass passage is reduced, it is possible to reduce the problems incurred with a straight flow path portion, i.e., the problems caused by an insufficient sectional area of the flow path and by the presence of a bent portion, and the consequent pressure loss.

Furthermore, the flow path portion is smoothly curved in such a direction that the angle between the rotation direction of the impeller and the flow direction of the intake air recirculated through the bypass passage is reduced. Because this configuration enables the compressed intake air to be smoothly recirculated without resisting the rotation of the impeller, it is possible to reduce the pressure loss occurring in the merging of the intake air entering the impeller and the intake air recirculated through the bypass passage. Thus, the merged high-pressure intake air flows into the rotating impeller, eliminating a surge in which the impeller idles.

It is desirable that the compressor housing (for example, a compressor housing 522 described below) that accommodates the impeller be formed integrally with the bypass passage.

According to the present application, because the bypass passage is formed in the compressor housing that accommodates the impeller, it is possible to reduce the component count, as well as the manufacturing cost and the weight of the apparatus. Furthermore, because the length of the bypass passage can be reduced, it is possible to reduce the pressure loss occurring in the merging of the intake air entering the impeller and the intake air recirculated through the bypass passage.

The present application can provide an internal-combustion-engine supercharger in which entrance of liquid into a bypass passage can be suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. An internal combustion engine comprising:
an intake passage; and
a supercharger installed on the engine and having:
    a centrifugal compressor disposed in the intake passage that compresses and discharges intake air flowing therein with a radial centrifugal force generated by rotation of an impeller about an axis, an upward direction and a downward direction being orthogonal to the axis;
    a pre-compression flow path through which the intake air to enter the impeller flows;
    a post-compression flow path that is disposed below the pre-compression flow path in a state where the internal-combustion-engine supercharger is operably installed in a vehicle and through which the intake air that is compressed by and discharged from the impeller flows;
    a bypass passage for recirculating the intake air in the post-compression flow path to the pre-compression flow path;
    a scroll flow path having a first portion disposed above the axis about which the impeller rotates, as measured in the upward direction; and
    a control valve that is disposed at an intermediate point of the bypass passage and controls a recirculation flow rate of the intake air, a connecting portion between the bypass passage and the pre-compression flow path being disposed closer to an extreme-bottom surface portion of a flow path section of the pre-compression flow path than an extreme-top portion of the flow path section of the pre-compression flow path, as measured in the upward direction and the downward direction, the connecting portion being disposed at a position other than the extreme-bottom surface portion of the flow path section of the pre-compression flow path in the state where the internal-combustion-engine supercharger is operably installed in the vehicle with a portion of the intake passage extending above the extreme-top portion of the flow path section of the pre-compression flow path and above the first portion of the scroll flow path, as measured in the upward direction.

2. The internal combustion engine according to claim 1, further comprising:
a compressor housing that accommodates the impeller formed integrally with the bypass passage.

3. The internal combustion engine according to claim 1, wherein the first portion of the scroll flow path has a larger cross-sectional area than a second portion of the scroll flow path that is disposed below the axis in the state where the internal-combustion-engine supercharger is operably installed in the vehicle, as measured in the downward direction.

4. The internal combustion engine according to claim 1, wherein an entirety of the connecting portion through which recirculating intake air flows is circumferentially spaced from the extreme-bottom surface portion of the flow path section of the pre-compression flow path.

5. The internal combustion engine according to claim 1, wherein a downstream portion of the intake passage extends in the downward direction below the extreme-bottom surface portion of the flow path section of the pre-compression flow path.

6. The internal combustion engine according to claim 1, wherein the first portion of the scroll flow path has a larger cross-sectional area than a second portion of the scroll flow path that is disposed below the axis, as measured in the downward direction, and
wherein an entirety of the connecting portion through which recirculating intake air flows is circumferentially spaced from the extreme-bottom surface portion of the flow path section of the pre-compression flow path.

7. The internal combustion engine according to claim 1, further comprising:
a flow path portion of the bypass passage between the connecting portion and the control valve curved in such a direction that an angle between a rotation direction of the impeller and the flow direction of the intake air recirculated through the bypass passage is 180 degrees or less.

8. The internal combustion engine according to claim 7, further comprising:
a compressor housing that accommodates the impeller formed integrally with the bypass passage.

9. The internal combustion engine according to claim 1, wherein the extreme-bottom surface portion has a left and right end at positions to the left and right of a vertical line extending through a center of the pre-compression flow path, by 15 degrees with respect to the center, in the flow path section of the pre-compression flow path in the state installed in the vehicle.

10. The internal combustion engine according to claim 9, further comprising:
a compressor housing that accommodates the impeller provided integrally with the bypass passage.

11. The internal combustion engine according to claim 9, further comprising:
a flow path portion of the bypass passage between the connecting portion and the control valve curved in such a direction that an angle between a rotation direction of the impeller and a flow direction of the intake air recirculated through the bypass passage is 180 degrees or less.

12. The internal combustion engine according to claim 11, further comprising:
a compressor housing that accommodates the impeller formed integrally with the bypass passage.

13. An internal combustion engine comprising:
an intake passage; and
a supercharger installed on the engine and having:
a centrifugal compressor disposed in the intake passage and having an impeller to compress and discharge intake air using a radial centrifugal force generated by rotating the impeller about an axis, an upward direction and a downward direction being orthogonal to the axis;
a pre-compression flow path through which the intake air is to flow into the impeller;
a post-compression flow path which is disposed below the pre-compression flow path in a state where the internal-combustion-engine supercharger is operably installed in a vehicle and through which the intake air discharged from the impeller is to flow;
a scroll flow path having a first portion disposed above the axis about which the impeller rotates, as measured in the upward direction;
a bypass passage via which the intake air in the post-compression flow path is to be recirculated to the pre-compression flow path, a connecting portion between the bypass passage and the pre-compression flow path being disposed closer to an extreme-bottom surface portion of a flow path section of the pre-compression flow path than an extreme-top portion of the flow path section of the pre-compression flow path, as measured in the upward direction and the downward direction, the connecting portion being disposed at a position other than the extreme-bottom surface portion located at a lowest portion in the flow path section of the pre-compression flow path in the state where the internal-combustion-engine supercharger is operably installed in the vehicle with a portion of the intake passage extending above the extreme-top portion of the flow path section of the pre-compression flow path and above the first portion of the scroll flow path, as measured in the upward direction; and
a control valve disposed in the bypass passage to control a recirculation flow rate of the intake air.

14. The internal combustion engine according to claim 13, further comprising:
a compressor housing accommodating the impeller, the compressor housing provided integrally with the bypass passage.

15. The internal combustion engine according to claim 13, wherein, in a section along an axis of the impeller, the connecting portion is provided a predetermined distance away from a top of the impeller on an upstream side in a flow direction of the intake air.

16. The internal combustion engine according to claim 13, further comprising:
a flow path portion of the bypass passage between the connecting portion and the control valve having a rectangular section.

17. The internal combustion engine according to claim 13, wherein the scroll flow path includes a circular section, the first portion of the scroll flow path which is disposed above the axis about which the impeller rotates having a greater cross-sectional area than a second portion of the scroll flow path which is disposed below the axis in the state in which the internal-combustion-engine supercharger is installed in the vehicle.

18. The internal combustion engine according to claim 13, wherein an entirety of the connecting portion through which recirculating intake air flows is circumferentially spaced from the extreme-bottom surface portion of the flow path section of the pre-compression flow path.

19. The internal combustion engine according to claim 13, wherein a downstream portion of the intake passage extends in the downward direction below the extreme-bottom surface portion of the flow path section of the pre-compression flow path.

20. The internal combustion engine according to claim 13, wherein the first portion of the scroll flow path has a larger cross-sectional area than a second portion of the scroll flow path that is disposed below the axis, as measured in the downward direction, and
wherein an entirety of the connecting portion through which recirculating intake air flows is circumferentially spaced from the extreme-bottom surface portion of the flow path section of the pre-compression flow path.

21. The internal combustion engine according to claim 13, further comprising:
a flow path portion of the bypass passage between the connecting portion and the control valve curved in such a direction that an angle between a rotation direction of the impeller and a flow direction of the intake air recirculated through the bypass passage is 180 degrees or less.

22. The internal combustion engine according to claim 21, further comprising:
a compressor housing accommodating the impeller provided integrally with the bypass passage.

23. The internal combustion engine according to claim 13, wherein the extreme-bottom surface portion has left and right ends at positions to left and right of a vertical line extending through a center of the pre-compression flow path, by 15 degrees with respect to the center, in the flow path section of the pre-compression flow path in the state where the internal-combustion-engine supercharger is installed in the vehicle.

24. The internal combustion engine according to claim 23, further comprising:
a compressor housing accommodating the impeller provided integrally with the bypass passage.

25. The internal combustion engine according to claim 23, further comprising:
a flow path portion of the bypass passage between the connecting portion and the control valve curved in such a direction that an angle between a rotation direction of the impeller and a flow direction of the intake air recirculated through the bypass passage is 180 degrees or less.

26. The internal combustion engine according to claim 25, further comprising:
a compressor housing accommodating the impeller provided integrally with the bypass passage.

27. An internal combustion engine comprising:
an intake passage; and
an internal-combustion-engine supercharger operably installed on the internal combustion engine, the internal-combustion-engine supercharger including:
a centrifugal compressor that is disposed in the intake passage of the internal combustion engine and compresses and discharges intake air flowing therein with a radial centrifugal force generated by rotation of an impeller about an axis, an upward direction and a downward direction being orthogonal to the axis;
a pre-compression flow path through which the intake air to enter the impeller flows;
a post-compression flow path that is disposed below the pre-compression flow path through which the intake air that is compressed by and discharged from the impeller flows;
a bypass passage for recirculating the intake air in the post-compression flow path to the pre-compression flow path;
a scroll flow path having a first portion disposed above the axis about which the impeller rotates, as measured in the upward direction; and
a control valve that is disposed at an intermediate point of the bypass passage and controls a recirculation flow rate of the intake air,
a connecting portion between the bypass passage and the pre-compression flow path being disposed closer to an extreme-bottom surface portion of a flow path section of the pre-compression flow path than an extreme-top portion of the flow path section of the pre-compression flow path, as measured in the upward direction and the downward direction, the connecting portion being disposed at a position other than the extreme-bottom surface portion of the flow path section of the pre-compression flow path with a portion of the intake passage extending above the extreme-top portion of the flow path section of the pre-compression flow path and above the first portion of the scroll flow path, as measured in the upward direction.

28. The internal combustion engine according to claim 27, wherein an entirety of the connecting portion through which recirculating intake air flows is circumferentially spaced from the extreme-bottom surface portion of the flow path section of the pre-compression flow path.

29. The internal combustion engine according to claim 27, wherein a downstream portion of the intake passage extends in the downward direction below the extreme-bottom surface portion of the flow path section of the pre-compression flow path.

30. The internal combustion engine according to claim 27, wherein the first portion of the scroll flow path has a larger cross-sectional area than a second portion of the scroll flow path that is disposed below the axis, as measured in the downward direction, and
wherein an entirety of the connecting portion through which recirculating intake air flows is circumferentially spaced from the extreme-bottom surface portion of the flow path section of the pre-compression flow path.

\* \* \* \* \*